(12) United States Patent
Wu et al.

(10) Patent No.: US 7,736,765 B2
(45) Date of Patent: Jun. 15, 2010

(54) GRANULAR PERPENDICULAR MAGNETIC RECORDING MEDIA WITH DUAL RECORDING LAYER AND METHOD OF FABRICATING SAME

(75) Inventors: Zhong (Stella) Wu, Fremont, CA (US); Samuel Dacke Harkness, IV, Berkeley, CA (US); Hans J. Richter, Palo Alto, CA (US); Alexander Yulievich Dobin, Milpitas, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 590 days.

(21) Appl. No.: 11/022,810

(22) Filed: Dec. 28, 2004

(65) Prior Publication Data

US 2006/0139799 A1 Jun. 29, 2006

(51) Int. Cl.
*G11B 5/66* (2006.01)

(52) U.S. Cl. .................. 428/829; 428/828; 428/830

(58) Field of Classification Search .................. 428/827, 428/829, 830
See application file for complete search history.

(56) References Cited

U.S. PATENT DOCUMENTS

| | | | |
|---|---|---|---|
| 4,251,842 A | 2/1981 | Iwasaki et al. | |
| 4,567,083 A | 1/1986 | Arioka et al. | |
| 4,731,300 A * | 3/1988 | Watanabe et al. | 428/636 |
| 4,743,491 A | 5/1988 | Asada et al. | |
| 5,204,193 A | 4/1993 | Sato et al. | |
| 5,981,054 A * | 11/1999 | Hikosaka et al. | 428/328 |
| 6,292,329 B1 | 9/2001 | Sato et al. | |
| 6,447,936 B1 * | 9/2002 | Futamoto et al. | 428/827 |
| 6,500,530 B1 * | 12/2002 | Sawamura et al. | 428/212 |
| 6,686,070 B1 | 2/2004 | Futamoto et al. | |
| 6,687,067 B2 | 2/2004 | Brianti et al. | |
| 6,699,600 B2 * | 3/2004 | Shimizu et al. | 428/828 |
| 6,707,643 B2 | 3/2004 | Takeo et al. | |
| 6,713,197 B2 * | 3/2004 | Nakamura et al. | 428/828 |
| 6,723,457 B2 | 4/2004 | Tanahashi et al. | |
| 6,759,148 B2 | 7/2004 | Tanahashi et al. | |
| 6,815,082 B2 * | 11/2004 | Girt | 428/828.1 |
| 6,830,824 B2 * | 12/2004 | Kikitsu et al. | 428/828.1 |
| 7,169,488 B2 * | 1/2007 | Chen et al. | 428/833.3 |
| 7,192,664 B1 * | 3/2007 | Wu et al. | 428/836.2 |
| 2003/0099869 A1 * | 5/2003 | Oikawa et al. | 428/694 TM |
| 2003/0152805 A1 * | 8/2003 | Bertero et al. | 428/692 |
| 2004/0023074 A1 * | 2/2004 | Shimizu et al. | 428/694 MM |
| 2004/0033390 A1 * | 2/2004 | Oikawa et al. | 428/694 MM |
| 2004/0185308 A1 * | 9/2004 | Koda et al. | 428/694 TS |
| 2004/0219329 A1 * | 11/2004 | Oikawa et al. | 428/65.3 |

* cited by examiner

*Primary Examiner*—Mark Ruthkosky
*Assistant Examiner*—Gary D Harris
(74) *Attorney, Agent, or Firm*—Shumaker & Sieffert, P.A.

(57) ABSTRACT

A granular perpendicular magnetic recording medium comprises a non-magnetic substrate and a granular perpendicular magnetic recording layer overlying the substrate, comprising a first granular perpendicular magnetic layer proximal the substrate and having a first saturation magnetization $(M_s)_1$, and a second granular perpendicular magnetic layer distal the substrate and having a second, different saturation magnetization $(M_s)_2$. Also disclosed is a method of fabricating the granular perpendicular magnetic recording medium.

11 Claims, 1 Drawing Sheet

GRANULAR PERPENDICULAR MAGNETIC RECORDING MEDIA WITH DUAL RECORDING LAYER AND METHOD OF FABRICATING SAME

FIELD OF THE INVENTION

The present invention relates to improved perpendicular magnetic recording media and methods for fabricating same. The invention has particular utility in the manufacture of very high to ultra-high areal recording density media, e.g., hard disks, utilizing granular perpendicular-type magnetic recording layers.

BACKGROUND OF THE INVENTION

Magnetic media are widely used in various applications, particularly in the computer industry for data/information storage and retrieval applications, typically in disk form, and efforts are continually made with the aim of increasing the areal recording density, i.e., bit density of the magnetic media. Conventional thin film thin-film type magnetic media, wherein a fine-grained polycrystalline magnetic alloy layer serves as the active recording layer, are generally classified as "longitudinal" or "perpendicular", depending upon the orientation of the magnetic domains of the grains of magnetic material.

Perpendicular recording media have been found to be superior to longitudinal media in achieving very high bit densities without experiencing the thermal stability limit associated with the latter. In perpendicular magnetic recording media, residual magnetization is formed in a direction ("easy axis") perpendicular to the surface of the magnetic medium, typically a layer of a magnetic material on a suitable substrate. Very high to ultra-high linear recording densities are obtainable by utilizing a "single-pole" magnetic transducer or "head" with such perpendicular magnetic media.

Efficient, high bit density recording utilizing a perpendicular magnetic medium requires interposition of a relatively thick (as compared with the magnetic recording layer), magnetically "soft" underlayer ("SUL"), i.e., a magnetic layer having a relatively low coercivity below about 1 kOe, such as of a NiFe alloy (Permalloy), between a non-magnetic substrate, e.g., of glass, aluminum (Al) or an Al-based alloy, and a magnetically "hard" recording layer having relatively high coercivity, typically about 3-8 kOe, e.g., of a cobalt-based alloy (e.g., a Co—Cr alloy such as CoCrPtB) having perpendicular anisotropy. The magnetically soft underlayer serves to guide magnetic flux emanating from the head through the magnetically hard perpendicular recording layer.

A typical conventional perpendicular recording system 20 utilizing a vertically oriented magnetic medium 21 with a relatively thick soft magnetic underlayer, a relatively thin hard magnetic recording layer, and a magnetic transducer head 16, is illustrated in FIG. 1, wherein reference numerals 10, 11, 4, 5, and 6, respectively, indicate a non-magnetic substrate, an optional adhesion layer, a soft magnetic underlayer, at least one non-magnetic seed layer (sometimes referred to as an "intermediate" layer or as an "interlayer"), and at least one magnetically hard perpendicular recording layer with its magnetic easy axis perpendicular to the film plane.

Still referring to FIG. 1, reference numerals 7 and 8, respectively, indicate the main (writing) and auxiliary poles of the magnetic transducer head 16. The relatively thin interlayer 5, comprised of one or more layers of non-magnetic materials, serves to (1) prevent magnetic interaction between the soft underlayer 4 and the at least one hard recording layer 6; and (2) promote desired microstructural and magnetic properties of the at least one magnetically hard recording layer As shown by the arrows in the figure indicating the path of the magnetic flux $\phi$, flux $\phi$ is seen as emanating from the main writing pole 7 of magnetic transducer head 16, entering and passing through the at least one vertically oriented, magnetically hard recording layer 5 in the region below main pole 7, entering and traveling within soft magnetic underlayer (SUL) 3 for a distance, and then exiting therefrom and passing through the at least one perpendicular hard magnetic recording layer 6 in the region below auxiliary pole 8 of transducer head 16. The direction of movement of perpendicular magnetic medium 21 past transducer head 16 is indicated in the figure by the arrow above medium 21.

With continued reference to FIG. 1, vertical lines 9 indicate grain boundaries of polycrystalline layers 5 and 6 of the layer stack constituting medium 21. Magnetically hard main recording layer 6 is formed on interlayer 5, and while the grains of each polycrystalline layer may be of differing widths (as measured in a horizontal direction) represented by a grain size distribution, they are generally in vertical registry (i.e., vertically "correlated" or aligned).

Completing the layer stack is a protective overcoat layer 14, such as of a diamond-like carbon (DLC), formed over hard magnetic layer 6, and a lubricant topcoat layer 15, such as of a perfluoropolyether (PFPE) material, formed over the protective overcoat layer.

Substrate 10 is typically disk-shaped and comprised of a non-magnetic metal or alloy, e.g., Al or an Al-based alloy, such as Al—Mg having a Ni—P plating layer on the deposition surface thereof, or alternatively substrate 10 is comprised of a suitable glass, ceramic, glass-ceramic, polymeric material, or a composite or laminate of these materials. Optional adhesion layer 11, if present, may comprise an up to about 200 Å thick layer of a material such as Ti, a Ti-based alloy, Cr, or a Cr-based alloy. Soft magnetic underlayer 4 is typically comprised of an about 500 to about 4,000 Å thick layer of a soft magnetic material selected from the group consisting of Ni, NiFe (Permalloy), Co, CoZr, CoZrCr, CoZrNb, CoFeZrNb, CoFe, Fe, FeN, FeSiAl, FeSiAlN, FeCoB, FeCoC, etc. Interlayer 5 typically comprises an up to about 300 Å thick layer or layers of non-magnetic material(s), such as Ru, TiCr, Ru/CoCr$_{37}$Pt$_6$, RuCr/CoCrPt, etc.; and the at least one magnetically hard perpendicular recording layer 6 is typically comprised of an about 50 to about 250 Å thick layer(s) of Co-based alloy(s) including one or more elements selected from the group consisting of Cr, Fe, Ta, Ni, Mo, Pt, V, Nb, Ge, B, and Pd.

A currently employed way of classifying magnetic recording media is on the basis by which the magnetic grains of the recording layer are mutually separated, i.e., segregated, in order to physically and magnetically de-couple the grains and provide improved media performance characteristics. According to this classification scheme, magnetic media with Co-based alloy magnetic recording layers (e.g., CoCr alloys) are classified into two distinct types: (1) a first type, wherein segregation of the grains occurs by diffusion of Cr atoms of the magnetic layer to the grain boundaries of the layer to form Cr-rich grain boundaries, which diffusion process requires heating of the media substrate during formation (deposition) of the magnetic layer; and (2) a second type, wherein segregation of the grains occurs by formation of oxides, nitrides, and/or carbides at the boundaries between adjacent magnetic grains to form so-called "granular" media, which oxides, nitrides, and/or carbides may be formed by introducing a minor amount of at least one reactive gas containing oxygen, nitrogen, and/or carbon atoms (e.g. $O_2$, $N_2$, $CO_2$, etc.) to the inert gas (e.g., Ar) atmosphere during sputter deposition of the Co alloy-based magnetic layer. The latter process does not require heating of the substrate to an elevated temperature.

Magnetic recording media with granular magnetic recording layers possess great potential for achieving very high and ultra-high areal recording densities. An advantage afforded by granular recording layers is significant suppression of media noise due to great reduction in the exchange coupling between adjacent magnetic grains, resulting from the presence of non-magnetic material, typically an oxide material, at the grain boundaries. As indicated above, current methodology for manufacturing granular-type magnetic recording media involves reactive sputtering of a target comprised of the ferromagnetic material for the magnetic recording layer (typically a Co-based alloy) in a reactive gas-containing atmosphere, e.g., an atmosphere comprising oxygen or a compound of oxygen, in order to incorporate oxides in the deposited film or layer and achieve smaller and more isolated magnetic grains. Granular magnetic layers formed in this manner have a reduced saturation magnetization ($M_s$) due to the oxide formation and consumption of a certain amount of the Co component of the ferromagnetic alloy. Alternatively, a target comprised of the ferromagnetic material (typically a Co-based alloy) and the oxide material may be directly sputtered in an inert atmosphere or an atmosphere comprising oxygen or a compound of oxygen. However, the oxide material sputtered from the target is subject to decomposition in the environment of the sputtering gas plasma, and, as a consequence, a certain amount of the Co component of the ferromagnetic alloy is again consumed.

Disadvantageously, however, neither of the above-described fabrication techniques or approaches is suitable for fabricating granular perpendicular magnetic recording media with ideal properties for high areal density recording. More specifically, granular perpendicular magnetic recording media fabricated according to either of the foregoing approaches do not take full advantage of the writing field provided by the transducer head during the writing process and do not facilitate use of minimized head-media spacings.

In view of the foregoing, there exists a clear need for high and ultra-high areal recording density, high performance granular-type perpendicular magnetic recording media, and related fabrication methodology, which: (1) take full advantage of the writing field provided by the transducer head; (2) facilitate use of minimized head-media spacings; (3) reduce the effect of demagnetization during the recording process; (4) provide a steeper magnetization curve for a given level or amount of intergranular exchange, thereby reducing the amount of exchange coupling without degradation of thermal stability; and (5) provide increased signal-to-noise ratios (SNR).

The present invention addresses and solves the above-described problems, drawbacks, and disadvantages associated with the above-described conventional methodology for the manufacture of high performance perpendicular-type magnetic recording media comprising granular-type magnetic recording layers, while maintaining full compatibility with all aspects of automated manufacture of such media.

DISCLOSURE OF THE INVENTION

An advantage of the present invention is improved granular perpendicular magnetic recording media.

Another advantage of the present invention is an improved method of fabricating granular magnetic recording media.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by an improved granular perpendicular magnetic recording medium, comprising:

(a) a non-magnetic substrate; and (b) a granular perpendicular magnetic recording layer overlying the substrate, comprising:

(i) a first granular perpendicular magnetic layer proximal the substrate and having a first saturation magnetization $(M_s)_1$; and (ii) a second granular perpendicular magnetic layer distal the substrate and having a second, different saturation magnetization $(M_s)_2$.

According to certain preferred embodiments of the present invention, $(M_s)_2 > (M_s)_1$. More preferably, $(M_s)_2$ is at least 20% greater than $(M_s)_1$; $(M_s)_1$ is below about 600 emu/cc, e.g., as low as about 200 emu/cc, and $(M_s)_2$ is above about 600 emu/cc. In addition, the amount of exchange coupling between adjacent magnetic grains in the first granular perpendicular magnetic layer is less than the amount of exchange coupling between adjacent magnetic grains in the second granular perpendicular magnetic layer; the amount of non-magnetic oxide material present between adjacent magnetic grains in the first granular perpendicular magnetic layer is less than the amount of non-magnetic oxide material present between adjacent magnetic grains in the second granular perpendicular magnetic layer; the first granular perpendicular magnetic layer is from about 10 to about 200 Å thick, and the second granular perpendicular magnetic layer is from about 2 to about 200 Å thick.

According to certain other preferred embodiments of the present invention, $(M_s)_1 > (M_s)_2$. More preferably, $(M_s)_1$ is at least 20% greater than $(M_s)_2$; $(M_s)_1$ is above about 600 emu/cc and $(M_s)_2$ is below about 600 emu/cc, e.g., $(M_s)_2$ is as low as about 200 emu/cc. In addition, the amount of exchange coupling between adjacent magnetic grains in the second granular perpendicular magnetic layer is less than the amount of exchange coupling between adjacent magnetic grains in the first granular perpendicular magnetic layer; the amount of non-magnetic oxide material present between adjacent magnetic grains in the second granular perpendicular magnetic layer is less than the amount of non-magnetic oxide material present between adjacent magnetic grains in the first granular perpendicular magnetic layer; the first granular perpendicular magnetic layer is from about 2 to about 200 Å thick, and the second granular perpendicular magnetic layer is from about 10 to about 200 Å thick.

Preferred embodiments of the present invention include those wherein the first and second granular perpendicular magnetic layers each comprise a layer of magnetic alloy comprised of CoPt and having a non-magnetic oxide material at boundaries between adjacent magnetic grains, the non-magnetic oxide material comprising at least one oxide selected from the group consisting of: $TiO_2$, $Al_2O_3$, $Nb_2O_5$, $SiO_2$, $MoO_3$, $Cr_2O_3$, $Ta_2O_5$, $ZrO_2$, $V_2O_5$, $WO_3$, and $Y_2O_3$.

According to embodiments of the present invention, the medium further comprises:

(c) a magnetically soft underlayer (SUL) between the substrate and the first granular perpendicular magnetic layer.

Another aspect of the present invention is a method of fabricating a granular perpendicular magnetic recording medium, comprising steps of:

(a) providing a non-magnetic substrate;
(b) forming over the substrate a granular perpendicular magnetic recording layer, comprising:
  (i) forming a first granular perpendicular magnetic layer proximal the substrate and having a first saturation magnetization $(M_s)_1$; and
  (ii) forming a second granular perpendicular magnetic layer distal the substrate and having a second, different saturation magnetization $(M_s)_2$.

According to preferred embodiments of the present invention, steps (b)(i) and (b)(2) respectively comprise forming first and second granular perpendicular magnetic layers wherein $(M_s)_1 > (M_s)_2$, or wherein $(M_s)_2 > (M_s)_1$. More preferably, steps (b)(i) and (b)(2) comprise forming said first and second granular perpendicular magnetic layers wherein $(M_s)_2$ is at least 20% greater than $(M_s)_1$ or wherein $(M_s)_1$ is at least 20% greater than $(M_s)_2$.

Preferred embodiments of the present invention include those wherein steps (b)(i) and (b)(2) respectively comprise forming first and second granular perpendicular magnetic layers wherein $(M_s)_1$ is below about 600 emu/cc (e.g., as low as about 200 emu/cc) and $(M_s)_2$ is above about 600 emu/cc, or wherein $(M_s)_1$ is above about 600 emu/cc and $(M_s)_2$ is below about 600 emu/cc (e.g., as low as about 200 emu/cc).

In addition, according to preferred embodiments of the present invention, steps (b)(i) and (b)(2) respectively comprise forming first and second granular perpendicular magnetic layers wherein the amount of exchange coupling between adjacent magnetic grains in the first granular perpendicular magnetic layer is less than the amount of exchange coupling between adjacent magnetic grains in the second granular perpendicular magnetic layer, or wherein the amount of exchange coupling between adjacent magnetic grains in the second granular perpendicular magnetic layer is less than the amount of exchange coupling between adjacent magnetic grains in the first granular perpendicular magnetic layer.

Further in addition, according to preferred embodiments of the present invention, steps (b)(i) and (b)(2) respectively comprise forming first and second granular perpendicular magnetic layers wherein the amount of non-magnetic oxide material present between adjacent magnetic grains in the first granular perpendicular magnetic layer is less than the amount of non-magnetic oxide material present between adjacent magnetic grains in the second granular perpendicular magnetic layer, or wherein the amount of non-magnetic oxide material present between adjacent magnetic grains in the second granular perpendicular magnetic layer is less than the amount of non-magnetic oxide material present between adjacent magnetic grains in the first granular perpendicular magnetic layer.

Preferred embodiments of the invention include those wherein steps (b)(i) and (b)(2) comprise forming first and second granular perpendicular magnetic layers wherein the first granular perpendicular magnetic layer is from about 10 to about 200 Å thick and the second granular perpendicular magnetic layer is from about 2 to about 200 Å thick, or wherein the first granular perpendicular magnetic layer is from about 2 to about 200 Å thick and the second granular perpendicular magnetic layer is from about 10 to about 200 Å thick.

Preferably, steps (b)(i) and (b)(2) comprise forming each of the first and second granular perpendicular magnetic layers of a magnetic alloy comprised of CoPt and having a non-magnetic oxide material at boundaries between adjacent magnetic grains, the non-magnetic oxide material comprising at least one oxide selected from the group consisting of: $TiO_2$, $Al_2O_3$, $Nb_2O_5$, $SiO_2$, $MoO_3$, $Cr_2O_3$, $Ta_2O_5$, $ZrO_2$, $V_2O_5$, $WO_3$, and $Y_2O_3$.

According to preferred embodiments of the present invention, the method further comprises a step of:

(c) forming a magnetically soft underlayer (SUL) between the substrate and the first granular perpendicular magnetic layer.

According to preferred embodiments of the invention, step (b) comprises forming at least one of the first and second granular perpendicular magnetic recording layers by means of a process selected from the group consisting of:

(1) sputtering a target comprised of at least one ferromagnetic alloy material and at least one oxide material;
(2) sputtering a target comprised of at least one ferromagnetic alloy material and at least one oxide-forming element in an atmosphere comprising oxygen or a compound containing oxygen; and
(3) sputtering a target comprised of a CoPt—$XO_y$ material, wherein $XO_y$ is an oxide material selected from the group consisting of: $TiO_2$, $Al_2O_3$, $Nb_2O_5$, $SiO_2$, $MoO_3$, $Cr_2O_3$, $Ta_2O_5$, $ZrO_2$, $V_2O_5$, $WO_3$, and $Y_2O_3$.

Particular embodiments of the invention include those wherein option (2) comprises sputtering the target in an excess of $O_2$ or oxygen-containing gas sufficient to consume a portion of a ferromagnetic element of the target.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

Figure 1:
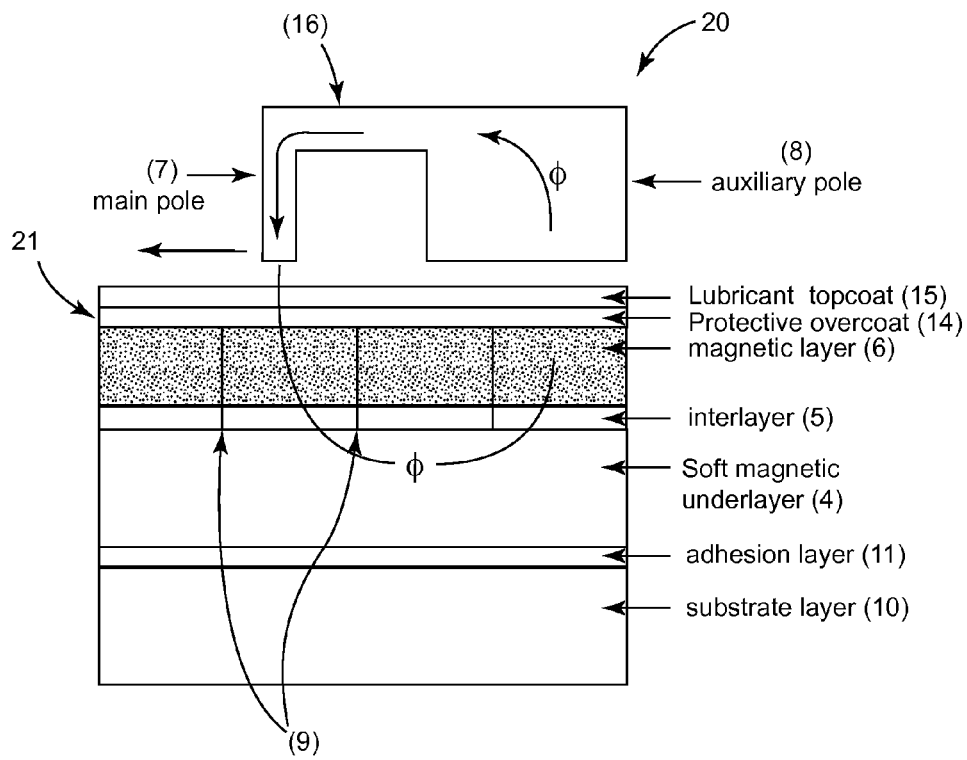
FIG. 1 schematically illustrates, in simplified cross-sectional view, a portion of a magnetic recording, storage, and retrieval system according to the conventional art, comprised of a perpendicular magnetic recording medium and a single pole transducer head.

The present invention addresses and solves problems, disadvantages, and drawbacks associated with granular perpendicular magnetic recording media fabricated according to conventional designs and design principles for such type recording media, and is based upon recognition that an ideal granular perpendicular magnetic recording medium requires a film or layer stack including a magnetic recording layer structure comprised of a first magnetically hard granular perpendicular recording layer proximal (i.e., closer to) a non-magnetic substrate and a second magnetically hard granular perpendicular recording layer epitaxially grown in overlying relation to the first layer, therefore distal (i.e., further from) the substrate. According to the invention, the first and second layers are fabricated such that:

(1) the saturation magnetization ($M_s$) of the first layer is different from that of the second layer, i.e., $(M_s)_2 > (M_s)_1$ according to certain embodiments of the invention and $(M_s)_1 > (M_s)_2$ according to other embodiments of the invention; and (2) the amount of exchange coupling between magnetic grains of the first layer is different from the amount of exchange coupling between magnetic grains of the second layer, i.e., according to certain embodiments of the invention, the amount of exchange coupling between magnetic grains of the first layer is smaller from the amount of exchange coupling between magnetic grains of the second layer; whereas, according to other embodiments of the invention, the amount of exchange coupling between magnetic grains of the first layer is greater than the amount of exchange coupling between magnetic grains of the second layer.

Dual (or bi-layer) granular perpendicular magnetic recording layer structures fabricated according to the principles of the present invention provide granular perpendicular magnetic recording media with several advantages vis-á-vis conventional granular perpendicular media, including inter alia:

(1) fuller utilization of the writing field;
(2) minimized transducer head-media spacing;
(3) reduced demagnetization effects during the writing process;
(4) obtainment of steeper demagnetization curves for a given level of intergranular exchange coupling, thereby leading to reduction in the amount of exchange without sacrifice of thermal stability; and
(5) higher signal-to-noise ratios (SNR) arising from the reduced demagnetization field.

More specifically, according to certain preferred embodiments of the invention, the saturation magnetization $(M_s)_2$ of the second granular perpendicular magnetic recording layer is at least 20% greater than the saturation magnetization $(M_s)_1$ of the first granular perpendicular magnetic recording layer, e.g., $(M_s)_1$ is below about 600 emu/cc (as low as about 200 emu/cc) and $(M_s)_2$ is above about 600 emu/cc. The amount of exchange coupling between adjacent magnetic grains in the first granular perpendicular magnetic layer is less than the amount of exchange coupling between adjacent magnetic grains in the second granular perpendicular magnetic layer; and the amount of non-magnetic oxide material present between adjacent magnetic grains in the first granular perpendicular magnetic layer is less than the amount of non-magnetic oxide material present between adjacent magnetic grains in the second granular perpendicular magnetic layer; the first granular perpendicular magnetic layer is from about 10 to about 200 Å thick, and the second granular perpendicular magnetic layer is from about 2 to about 200 Å thick.

According to other preferred embodiments of the invention, the saturation magnetization $(M_s)_1$ of the first granular perpendicular magnetic recording layer is at least 20% greater than the saturation magnetization $(M_s)_2$ of the second granular perpendicular magnetic recording layer, e.g., $(M_s)_2$ is below about 600 emu/cc (as low as about 200 emu/cc) and $(M_s)_1$ is above about 600 emu/cc. The amount of exchange coupling between adjacent magnetic grains in the second granular perpendicular magnetic layer is less than the amount of exchange coupling between adjacent magnetic grains in the first granular perpendicular magnetic layer; and the amount of non-magnetic oxide material present between adjacent magnetic grains in the second granular perpendicular magnetic layer is less than the amount of non-magnetic oxide material present between adjacent magnetic grains in the first granular perpendicular magnetic layer; the first granular perpendicular magnetic layer is from about 2 to about 200 Å thick, and the second granular perpendicular magnetic layer is from about 10 to about 200 Å thick.

According to preferred embodiments of the invention, the first and second granular perpendicular magnetic layers each comprise a layer of magnetic alloy comprised of CoPt, with a non-magnetic oxide material at boundaries between adjacent magnetic grains, the non-magnetic oxide material comprising at least one oxide selected from the group consisting of: $TiO_2$, $Al_2O_3$, $Nb_2O_5$, $SiO_2$, $MoO_3$, $Cr_2O_3$, $Ta_2O_5$, $ZrO_2$, $V_2O_5$, $WO_3$, and $Y_2O_3$; and the film or layer stack of the media includes at least a magnetically soft underlayer (SUL) between the substrate and the first granular perpendicular magnetic recording layer.

Figure 2:
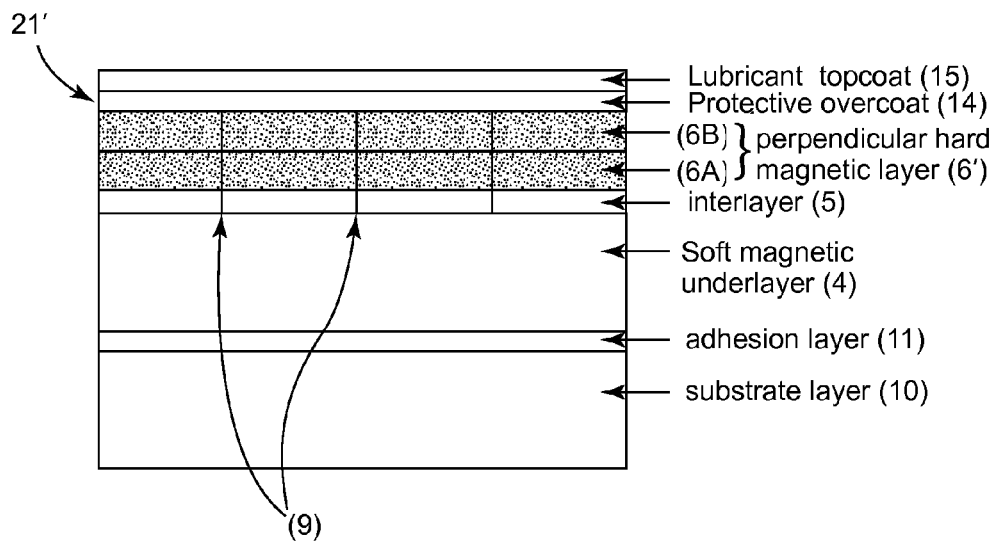
FIG. 2 schematically illustrates, in simplified cross-sectional view, a portion of an improved granular perpendicular magnetic recording medium according to the present invention.

Referring to FIG. 2, shown therein, in simplified cross-sectional view, is a portion of an improved granular perpendicular magnetic recording medium 21' according to an illustrative, but non-limitative, embodiment of the present invention, adapted for use in a single-pole system such as illustrated in FIG. 1. More specifically, granular perpendicular recording medium 21' resembles the conventional granular perpendicular magnetic recording medium 21 of FIG. 1 and comprises a series of thin-film layers arranged in an overlying (stacked) sequence. As before, reference numerals 10, 11, 4, 5, and 6', respectively, indicate a non-magnetic substrate, an optional adhesion layer, a soft magnetic underlayer, at least one non-magnetic seed or interlayer, and at least one magnetically hard granular perpendicular recording layer with its magnetic easy axis perpendicular to the film plane. Typically, the various intermediate and underlayers should establish a high surface roughness in order to induce grain separation in the magnetic recording layer.

The relatively thin interlayer 5, comprised of one or more layers of non-magnetic materials, serves to: (1) prevent magnetic interaction between the soft underlayer 4 and the at least one magnetically hard granular perpendicular recording layer 6'; (2) promote desired microstructural and magnetic properties of the at least one magnetically hard granular perpendicular recording layer 6', e.g., by serving to establish a crystallographically oriented base layer for inducing growth of a desired plane in the overlying magnetically hard granular perpendicular recording film or layer 6' (e.g., a <0002> hcp plane); and (3) establish a high surface roughness in order to induce grain separation in the magnetically hard recording layer.

With continued reference to FIG. 2, vertical lines 9 indicate grain boundaries of polycrystalline layers 5 and 6' of the layer stack constituting medium 21'. Magnetically hard main recording layer 6' is formed on interlayer 5, and while the grains of each polycrystalline layer may be of differing widths (as measured in a horizontal direction) represented by a grain size distribution, they are generally in vertical registry (i.e., vertically "correlated" or aligned).

Completing the layer stack is a protective overcoat layer 14, such as of a diamond-like carbon (DLC), formed over hard magnetic layer 6', and a lubricant topcoat layer 15, such as of a perfluoropolyethylene material, formed over the protective overcoat layer.

Substrate 10 is typically disk-shaped and comprised of a non-magnetic metal or alloy, e.g., Al or an Al-based alloy, such as Al—Mg having a Ni—P plating layer on the deposition surface thereof, or alternatively substrate 10 is comprised of a suitable glass, ceramic, glass-ceramic, polymeric material, or a composite or laminate of these materials. Optional adhesion layer 11, if present, may comprise an up to about 200 Å thick layer of a material such as Ti, a Ti-based alloy, Cr, or a Cr-based alloy. Soft magnetic underlayer 4 typically comprises an about 500 to about 4,000 Å thick layer of a soft magnetic material selected from the group consisting of Ni, NiFe (Permalloy), Co, CoZr, CoZrCr, CoZrNb, CoFeZrNb, CoFe, Fe, FeN, FeSiAl, FeSiAlN, FeCoB, FeCoC, etc. Interlayer 5 typically comprises an up to about 300 Å thick layer or layers of non-magnetic material(s), such as Ru, TiCr, Ru/CoCr$_{37}$Pt$_6$, RuCr/CoCrPt, etc.

According to the invention, magnetically hard granular perpendicular recording layer 6' comprises a first (illustratively, lower) magnetically hard granular perpendicular recording layer 6$_A$ proximal (i.e., closer to) substrate 10 and an overlying second (illustratively, upper) magnetically hard granular perpendicular recording layer 6$_B$ distal (i.e., further from) substrate 10, wherein the first and second granular perpendicular magnetic recording layers are fabricated such that the saturation magnetization (M$_s$)$_2$ of the second granular perpendicular magnetic recording layer 6$_B$ is different from the saturation magnetization (M$_s$)$_1$ of the first granular perpendicular magnetic recording layer 6$_A$, i.e., at least 20% larger according to a first group of embodiments of the invention, or at least 20% smaller according to a second group of embodiments of the invention, in order to contribute to a higher reading signal. More particularly, according to the first group, (M$_s$)$_1$ is below about 600 emu/cc and (M$_s$)$_2$ is above about 600 emu/cc; and according to the second group, (M$_s$)$_1$ is above about 600 emu/cc and (M$_s$)$_2$ is below about 600 emu/cc. According to the first group, (M$_s$)$_1$ is as low as about 200 emu/cc; whereas, according to the second group, (M$_s$)$_2$ is as low as about 200 emu/cc. In addition, the magnetic anisotropy (H$_k$)$_2$ of the second layer preferably is different from the magnetic anisotropy (H$_k$)$_1$ of the first layer in order to better utilize the head field during the writing process; and the amounts of exchange coupling and non-magnetic oxide material present between adjacent magnetic grains in the first granular perpendicular magnetic layer 6$_A$ are different from the amounts of exchange coupling and non-magnetic oxide material present between adjacent magnetic grains in the second granular perpendicular magnetic layer 6$_B$. Specifically, in the first group of embodiments, the amounts of exchange coupling and non-magnetic oxide material present between adjacent magnetic grains in the first magnetic layer are smaller than the corresponding amounts in the second layer; whereas, in the second group of embodiments, the amounts of exchange coupling and non-magnetic oxide material present between adjacent magnetic grains in the first magnetic layer are greater than the corresponding amounts in the second layer. Finally, in the first group of embodiments, the first granular perpendicular magnetic layer 6$_A$ is from about 10 to about 200 Å thick, and the second granular perpendicular magnetic layer 6$_B$ is from about 2 to about 200 ANG. thick; whereas, in the second group of embodiments, the first granular perpendicular magnetic layer 6$_A$ is from about 2 to about 200 Å tick, and the second granular perpendicular magnetic layer 6$_B$ is from about 10 to about 200 Å thick.

As indicated above, the first granular perpendicular magnetic recording layer 6$_A$ has a different amount of intergranular exchange coupling than the second granular perpendicular magnetic recording layer 6$_B$, by virtue of incorporation of different amounts of appropriate segregation materials in the grain boundaries. By way of illustration, but not limitation, this may be achieved by utilizing a CoPt magnetic sputtering target including a sufficient amount of at least one strongly bound, non-magnetic oxide material, e.g., 6-12 mol. % TiO$_2$, 6-12 mol. % SiO$_2$, 5-10 mol. % Nb$_2$O$_5$, 5-12 mol. % Al$_2$O$_3$, 5-10 mol. % Ta$_2$O$_5$, 4-12 mol. % ZrO$_2$, 4-12 mol. % V$_2$O$_5$, 4-12 mol. % MoO$_3$, 4-16 mol. % Cr$_2$O$_3$, 4-12 mol. % WO$_3$, and 4-10 mol. % Y$_2$O$_3$. In addition, the CoPt-based sputtering target may include a small amount (i.e., <~10 at. %) of other elements, e.g., Cr, Fe, Ta, Ni, Mo, V, Nb, Ge, B, and Pd. In the first group of embodiments, the second granular perpendicular magnetic recording layer 6$_B$ typically includes a lower amount of the above-mentioned non-magnetic oxide material(s) or other grain segregation elements or materials, thus a higher Co concentration than in the first layer 6$_A$, e.g., >~60 at. %, with sufficient Pt for increased magnetic anisotropy (H$_k$), e.g., >~12 at. %. In the second group of embodiments, the situation is reversed, i.e., first granular perpendicular magnetic recording layer 6$_A$ typically includes a lower amount of the above-mentioned non-magnetic oxide material(s) or other grain segregation elements or materials, thus a higher Co concentration than in the second layer 6$_B$, e.g., >~60 at. %, with sufficient Pt for increased magnetic anisotropy (H$_k$), e.g., >~12 at. %.

Epitaxial growth of the second granular perpendicular magnetic recording layer 6$_B$ on the first granular perpendicular magnetic recording layer 6$_A$ is preferably established via careful control of the deposition process and underlayer/intermediate layer formation in order to propagate the well-separated grain structure of the first layer 6$_A$ in the second layer 6$_B$, as well as hcp <0002> crystalline anisotropy with a narrow distribution, e.g., <~5 degrees.

MOKE loops of dual-layer granular perpendicular media fabricated according to the above described design principles indicate that the magnetization switching has a single mode distribution, experimentally confirming that the first and second granular perpendicular magnetic recording layers 6$_A$ and 6$_B$ of magnetic recording layer 6' are rigidly exchange coupled. Consequently, the inventive media designs do not disadvantageously result in a broader magnetic switching distribution.

Another advantage afforded by the instant invention is flexibility in selection of technique for forming the first and/or second granular perpendicular magnetic recording layers 6$_A$ and/or 6$_B$ of magnetic recording layer 6'. For example, at least one of the layers may be formed by: (1) sputtering a target comprised of at least one ferromagnetic alloy material and at least one oxide material; (2) sputtering a target comprised of at least one ferromagnetic alloy material and at least one oxide-forming element in an atmosphere comprising or a compound of oxygen; or (3) sputtering a target comprised of a CoPt—XO$_y$ material, wherein XO$_y$ is an oxide material selected from the group consisting of: TiO$_2$, Al$_2$O$_3$, Nb$_2$O$_5$, SiO$_2$, MoO$_3$, Cr$_2$O$_3$, Ta$_2$O$_5$, ZrO$_2$, V$_2$O$_5$, WO$_3$, and Y$_2$O$_3$. In the case of option (2), the target may be sputtered in an excess of O$_2$ or oxygen-containing gas sufficient to consume a portion of a ferromagnetic element of the target. In each instance, DC magnetron or RF sputtering (static or pass-by type) may be utilized.

By way of illustration, but not limitation, a first layer 6$_A$ with relatively low (M$_s$)$_1$<~600 emu/cc may be formed by sputtering a CoPt—X magnetic target (where X is an element forming a strongly bound non-magnetic oxide material) in a reactive gas environment, e.g., O$_2$ or an oxygen-containing gas, to form a non-magnetic X-oxide material in the boundaries between adjacent magnetic grains, the amount of X-oxide being sufficient to reduce (M$_s$)$_1$ to lower than ~600 emu/ cc. Alternatively, a first layer $6_A$ with relatively low $(M_s)_1 < \sim 600$ emu/cc may be formed by sputtering CoPt magnetic target in an atmosphere comprising an excess of $O_2$ or oxygen-containing gas in order to consume a sufficient amount of Co to form CoO.

As indicated above, the second granular perpendicular magnetic recording layer $6_B$ typically is formed by sputtering of a CoPt, CoPt—X, or CoPt—XO$_y$ magnetic target under conditions selected to include a different amount (i.e., higher or lower) of the above-mentioned non-magnetic oxide material(s) or other grain segregation elements or materials than in the first granular perpendicular magnetic recording layer $6_A$. Thus, in the first group of embodiments, the second layer $6_B$ typically includes a higher Co concentration than in the first layer $6_A$, e.g., $>\sim 60$ at. %, with sufficient Pt for increased magnetic anisotropy ($H_k$), e.g., $>\sim 12$ at. %; whereas, in the second group of embodiments, the first layer $6_A$ typically includes a higher Co concentration than in the second layer $6_B$, e.g., $>\sim 60$ at. %, with sufficient Pt for increased magnetic anisotropy ($H_k$), e.g., $>\sim 12$ at. %.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A granular perpendicular magnetic recording medium, comprising:
   (a) a non-magnetic substrate; and
   (b) a granular perpendicular magnetic recording layer overlying said substrate, comprising:
      (i) a first granular perpendicular magnetic layer proximal said substrate and having a first saturation magnetization $(M_s)_1$, wherein the first granular perpendicular magnetic layer consists of a CoPt magnetic alloy and a non-magnetic oxide material at boundaries between adjacent magnetic grains, and wherein the magnetic oxide material in the first granular perpendicular magnetic layer is selected from at least one of $TiO_2$, $SiO_2$, $Nb_2O_5$, $Al_2O_3$, $Ta_2O_5$, $ZrO_2$, $V_2O_5$ or $Y_2O_3$; and
      (ii) a second granular perpendicular magnetic layer distal said substrate and having a second, different saturation magnetization $(M_s)_2$, wherein the second granular perpendicular magnetic layer is directly on the first granular perpendicular magnetic layer, wherein the second perpendicular granular magnetic layer consists of a CoPt magnetic alloy and a non-magnetic oxide material at boundaries between adjacent magnetic grains, and wherein the magnetic oxide material in the second granular perpendicular magnetic layer is selected from at least one of $TiO_2$, $SiO_2$, $Nb_2O_5$, $Al_2O_3$, $Ta_2O_5$, $ZrO_2$, $V_2O_5$ or $Y_2O_3$, and wherein:
   $(M_s)_1$ is about 200 emu/cc to about 600 emu/cc, and
   $(M_s)_2$ is greater than about 600 emu/cc and at least 20% greater than $(M_s)_1$.

2. The medium as in claim 1, further comprising: (c) a magnetically soft underlayer (SUL) between said substrate and said first granular perpendicular magnetic layer.

3. The medium as in claim 1, wherein the CoPt magnetic ahoy in the second granular perpendicular magnetic recording layer has greater than about 60 at % Co and greater than about 12 at % Pt.

4. The medium as in claim 3, wherein the non-magnetic oxide material in the first granular perpendicular magnetic recording layer is 6-12 mol % of $TiO_2$, $SiO_2$, or $Al_2O_3$, or 5-10 mol % of $Ta_2O_5$, $ZrO_2$, $V_2O_5$ or $Y_2O_3$.

5. The medium as in claim 1, wherein the first granular perpendicular magnetic recording layer has a thickness of about 10 to about 200 Å, and the second granular perpendicular magnetic recording layer has a thickness of about 2 to about 200 Å.

6. A perpendicular magnetic recording medium, wherein the magnetic recording medium has the following layers, in order:
   a non-magnetic substrate;
   a soft magnetic underlayer;
   an interlayer comprising Ru or a Ru alloy;
   a first granular perpendicular magnetic layer having a first saturation magnetization $(M_s)_1$, wherein the first granular perpendicular magnetic layer consists of a CoPt magnetic alloy and a non-magnetic oxide material at boundaries between adjacent magnetic grains, and wherein the magnetic oxide material in the first granular perpendicular magnetic layer is selected from at least one of $TiO_2$, $SiO_2$, $Nb_2O_5$, $Al_2O_3$, $Ta_2O_5$, $ZrO_2$, $V_2O_5$ or
   a second granular perpendicular magnetic layer having a second, different saturation magnetization $(M_s)_2$, wherein the second perpendicular granular magnetic layer consists of a CoPt magnetic alloy and a non-magnetic oxide material at boundaries between adjacent magnetic grains, and wberein the magnetic oxide material in the second granular perpendicular magnetic layer is selected from at least one of $TiO_2$, $SiO_2$, $Nb_2O_5$, $Al_2O_3$, $Ta_2O_5$, $ZrO_2$, $V_2O_5$ or $Y_2O_3$, and wherein:
   $(M_s)_1$ is about 200 emu/cc to about 600 emu/cc, and
   $(M_s)_2$ is greater than about 600 emu/cc and at least 20% greater than $(M_s)_1$;
   a protective overcoat; and
   a lubricant topcoat.

7. The perpendicular magnetic recording medium of claim 6, wherein the CoPt magnetic alloy in the second granular perpendicular magnetic recording layer has greater than about 60 at % Co and greater than about 12 at % Pt.

8. The perpendicular magnetic recording medium of claim 7, wherein the non-magnetic oxide material in the first granular perpendicular magnetic recording layer is 6-12 mol % of $TiO_2$, $SiO_2$, or $Al_2O_3$, or 5-10 mol % of $Ta_2O_5$, $ZrO_2$, $V_2O_5$ or $Y_2O_3$.

9. The perpendicular magnetic recording medium of claim 6, wherein the first granular perpendicular magnetic recording layer has a thickness of about 10 to about 200 Å, and the second granular perpendicular magnetic recording layer has a thickness of about 2 to about 200 Å.

10. The perpendicular magnetic recording medium of claim 6, further comprising an adhesion layer between the substrate and the soft magnetic underlayer.

11. A perpendicular magnetic recording medium, comprising:
   a magnetic recording layer on a substrate, wherein the magnetic recording layer comprises:
   at least at least two granular perpendicular magnetic layers, wherein each of the granular perpendicular magnetic layers consists of a CoPt magnetic alloy and a non-magnetic oxide material at boundaries between adjacent magnetic grains, wherein the magnetic oxide material is selected from at least one of $TiO_2$, $SiO_2$, $Nb_2O_5$, $Al_2O_3$, $Ta_2O_5$, $ZrO_2$, $V_2O_5$ or $Y_2O_3$, wherein the amount of non-magnetic oxide material in the granular magnetic recording layers is selected such that the granular perpendicular magnetic layer closest to the substrate has the lowest saturation magnetization $(M_s)_1$ and wherein the $(M_s)$ of the granular perpendicular magnetic layer closest to the substrate is between about 200 and about 600 emu/cc.

* * * * *